United States Patent [19]

Gnyra

[11] 4,051,222
[45] * Sept. 27, 1977

[54] COARSENING OF PARTIALLY CALCINED ALUMINA DUST

[75] Inventor: Bohdan Gnyra, Arvida, Canada

[73] Assignee: Alcan Research and Development Limited, Montreal, Canada

[*] Notice: The portion of the term of this patent subsequent to Sept. 16, 1992, has been disclaimed.

[21] Appl. No.: 590,593

[22] Filed: June 26, 1975

Related U.S. Application Data

[63] Continuation-in-part of Ser. No. 182,481, Sept. 21, 1971, Pat. No. 3,906,084.

[51] Int. Cl.$^2$ ............................ C01F 7/06; C01F 7/14
[52] U.S. Cl. .................................. 423/127; 423/121; 423/629; 423/630; 23/313 R; 23/305 A; 23/301

[58] Field of Search ............... 423/625, 629, 630, 127, 423/122, 121; 23/305 A, 313 R; 264/117

[56] References Cited

U.S. PATENT DOCUMENTS

| | | | |
|---|---|---|---|
| 2,283,849 | 5/1942 | Coles | 423/629 X |
| 2,707,669 | 5/1955 | Houston et al. | 23/305 A |
| 3,466,142 | 9/1969 | Hambly | 23/313 R |

*Primary Examiner*—Herbert T. Carter
*Attorney, Agent, or Firm*—Cooper, Dunham, Clark, Griffin & Moran

[57] ABSTRACT

Alumina dust, particularly partially calcined alumina dust, is coarsened by forming an aqueous admixture or slurry comprising the alumina dust and finely divided calcium carbonate and introducing the resulting aqueous admixture or slurry into Bayer pregnant liquor and precipitating alumina trihydrate from the resulting Bayer pregnant liquor.

26 Claims, 2 Drawing Figures

COARSENING OF PARTIALLY CALCINED ALUMINA DUST

This invention is a continuation-in-part of my copending application Ser. No. 182,481 filed Sept. 21, 1971 entitled "Precipitation of Alumina Trihydrate from Bayer Pregnant liquors," now U.S. Pat. No. 3,906,084.

This invention is directed to the coarsening of finely divided alumina dust. In one aspect this invention is directed to the coarsening of finely divided alumina dust in the presence of Bayer pregnant liquor under conditions such that concomitant with the precipitation of alumina trihydrate from the Bayer pregnant liquor the finely divided alumina dust added to the Bayer pregnant liquor is coarsened.

In the production of alumina via the Bayer process involving calcining of the alumina trihydrate precipitated in the Bayer process, a substantial amount of alumina dust is produced. The recovery and/or elimination of this alumina dust is of considerable environmental and economic interest. Alumina dust in the production of alumina via the Bayer process is usually recovered by mechanical and/or electrostatic devices, such as filters, cyclone dust separators and electrostatic precipitators. The resultant recovered dust is usually partially calcined and has a very fine particle size, particularly the alumina dust recovered from the electrostatic precipitators which might have a particle size such that at least about 80–90% by weight of the partially calcined alumina dust is smaller than about 44 microns (325 mesh), more or less.

One technique for the disposal of the fine alumina dust generated in the production of alumina from alumina trihydrate produced vis the Bayer process involves blending the alumina dust with the alumina product stream leaving the calcining apparatus wherein alumina trihydrate is calcined to alumina. The amount of fine alumina dust blended to the product alumina stream usually amounts to about 2–3% by weight of the total product flow. The fine alumina dust in the alumina product tends to cause environmental problems and to eventually result in the loss of useful alumina material since the fine dust escapes from the alumina product during material transfer and handling between the alumina plant and the aluminum-producing plant and even at the aluminum production cells.

Another technique employed for disposal, actually coarsening of the recovered alumina dust, involves agglomerating the alumina dust in Bayer pregnant liquor under relatively short-cycle batch precipitation conditions. Under these conditions, however, due to the extreme fineness of the alumina dust, essentially all of the alumina dust having a particle size smaller than $44\mu$, the coarsening or agglomeration of the alumina dust is very slow. In fact, it has been observed that alumina dust, particularly the very fine, partially calcined alumina dust recovered from the electrostatic precipitators, may yield a product possessing a greater percentage of fine alumina material, e.g. minus $44\mu$ particle size material, than the starting or initial alumina dust material itself.

Accordingly, it is an object of this invention to provide a process for the coarsening or agglomeration of very fine particle size alumina or alumina dust.

It is another object of this invention to provide a method for the treatment of partially calcined alumina dust, such as may be derived from the calcining of alumina trihydrate in the manufacture of alumina involving the processing of Bayer pregnant liquor, the precipitation of alumina trihydrate therefrom and the calcining of the resulting precipitated alumina trihydrate.

Still another object of this invention is to provide a method for the agglomeration or coarsening of partially calcined alumina dust recovered from the electrostatic precipitators, mechanical filters or cyclone dust collectors usually employed in the production of alumina from alumina trihydrate produced via the Bayer process.

Yet another object of this invention is to provide an overall process for the production of alumina trihydrate involving the simultaneous or concomitant coarsening or agglomeration of alumina dust, such as very fine partially calcined alumina dust having a particle size such that at least about 80–90% by weight of the alumina dust has a particle size smaller than 44 microns.

How these and other objects of this invention are achieved will become apparent in the light of the accompanying disclosure made with reference to the accompanying drawings wherein:

FIG. 1 shows a flow scheme in accordance with this invention for the coarsening of finely divided alumina dust; and wherein

In at least one embodiment of the practices of this invention at least one of the foregoing objects will be achieved.

In accordance with this invention it has been discovered that alumina dust, particularly the very fine alumina dust such as may be generated and recovered during the calcining of alunina trihydrate to produce alumina, is coarsened or agglomerated by forming an aqueous admixture or slurry comprising the alumina dust and finely divided calcium carbonate or calcite, introducing the resulting aqueous admixture or slurry into Bayer pregnant liquor, with or without the presence of added seed alumina trihydrate, and precipitated alumina trihydrate from the resulting Bayer pregnant liquor. The practices of this invention are particularly applicable to the coarsening or agglomeration of the very fine partially calcined alumina dust recovered from the electrostatic precipitators and cyclone dust separators and other dust separating devices usually associated with a calcining apparatus for the calcining of alumina trihydrate to produce alumina. The practice of this invention is particularly applicable, as indicated hereinabove, to the coarsening of superfine, partially calcined alumina dust recovered from the electrostatic precipitators, such alumina dust having a particle size such that essentially all, i.e. at least about 85–95% by weight, of the alumina dust has a particle size smaller than 44 microns (325 mesh), such as a particle size wherein less than about 10% by weight of the dust has a particle size greater than 44 microns. Optionally, excess fine seed alumina trihydrate may be included with the alumina dust for coarsening.

As indicated hereinabove the alumina dust which is advantageously coarsened or agglomerated in accordance with the practice of this invention has an extremely small particle size. For example, alumina dust recovered by means of cyclone dust separators associated with a rotary kiln for the production of calcined alumina from Bayer process alumina trihydrate might have a particle size such that between about 85–92% by weight is smaller than 44 microns or 325 mesh. Such dust is characterized by a loss on ignition (LOI) of about 12–15% by weight after 1 hour at 1000° C. and would comprise about 20% by weight $Al_2O_3.3H_2O$, about 5% by weight $\alpha$-$Al_2O_3$ and about 60–65% by weight $Al_2O_3.H_2O$ and $\gamma$-$Al_2O_3$.

The partially calcined electrostatic precipitator dust which is a very fine alumina dust is very advantageously coarsened in accordance with the practices of this invention. Such electrostatic precipitator dust usually has a particle size such that 92–98% by weight is smaller than 44 microns (325 mesh) with a substantial amount, such as in the range 25–45% by weight, having a particle size smaller than 10 microns. The loss on ignition of electrostatic precipitator alumina dust is usually about 15–20% by weight after 1 hour at 1000° C. and the composition of the dust is substantially that described hereinabove in connection with the alumina dust recovered from cyclone separators and, as indicated, comprises a mixture of $\alpha$-$Al_2O_3$, $\gamma$-$Al_2O_3$, $Al_2O_3.H_2O$ and $Al_2O_3.3H_2O$.

It is interesting to note that the alumina dusts capable of being coarsened in accordance with the practices of this invention, particularly the cyclone separator and electrostatic precipitator alumina dust, contain considerable amounts of amorphous boehmite ($Al_2O_3.H_2O$) which, when incorporated in Bayer spent or Bayer pregnant liquors, will tend to dissolve even at low temperatures of about 160°–180° F. Thus, some 5–10% of the dust would dissolve in spent liquor at about 160° F. in the first 30 minutes of mixing and as much as 15–20% of the electrostatic precipitator dust dissolves in Bayer spent liquor at 180° F., such as when 5 grams of electrostatic precipitator dust is added to 500 ml of Bayer spent liquor.

In the practices of this invention it is preferred to employ for the coarsening of the partially calcined alumina dust a Bayer pregnant liquor of the usual industrial concentration or compositions as would be employed for the production and precipitation of alumina trihydrate, such as a Bayer pregnant liquor containing about 100–130 g/l $Al_2O_3$, about 160–200 g/l caustic soda (calculated as $Na_2CO_3$) and about 230–260 g/l total titratable soda (TTS).

As indicated hereinabove, in the practices of this invention the finely divided alumina dust is coarsened by forming an aqueous slurry or admixture thereof together with finely divided calcium carbonate or calcite. The resulting aqueous slurry or admixture is then incorporated into or added directly to Bayer pregnant liquor and alumina trihydrate then precipitated from the resulting Bayer pregnant liquor. During the precipitation of the alumina trihydrate from Bayer pregnant liquor coarsening or agglomeration of the thus-incorporated or added alumina dust takes place The finely divided calcium carbonate or calcite employed in the aqueous slurry or admixture with the alumina dust may be chemical reagent grade or commercial grade powdered calcium carbonate.

Figure 1:
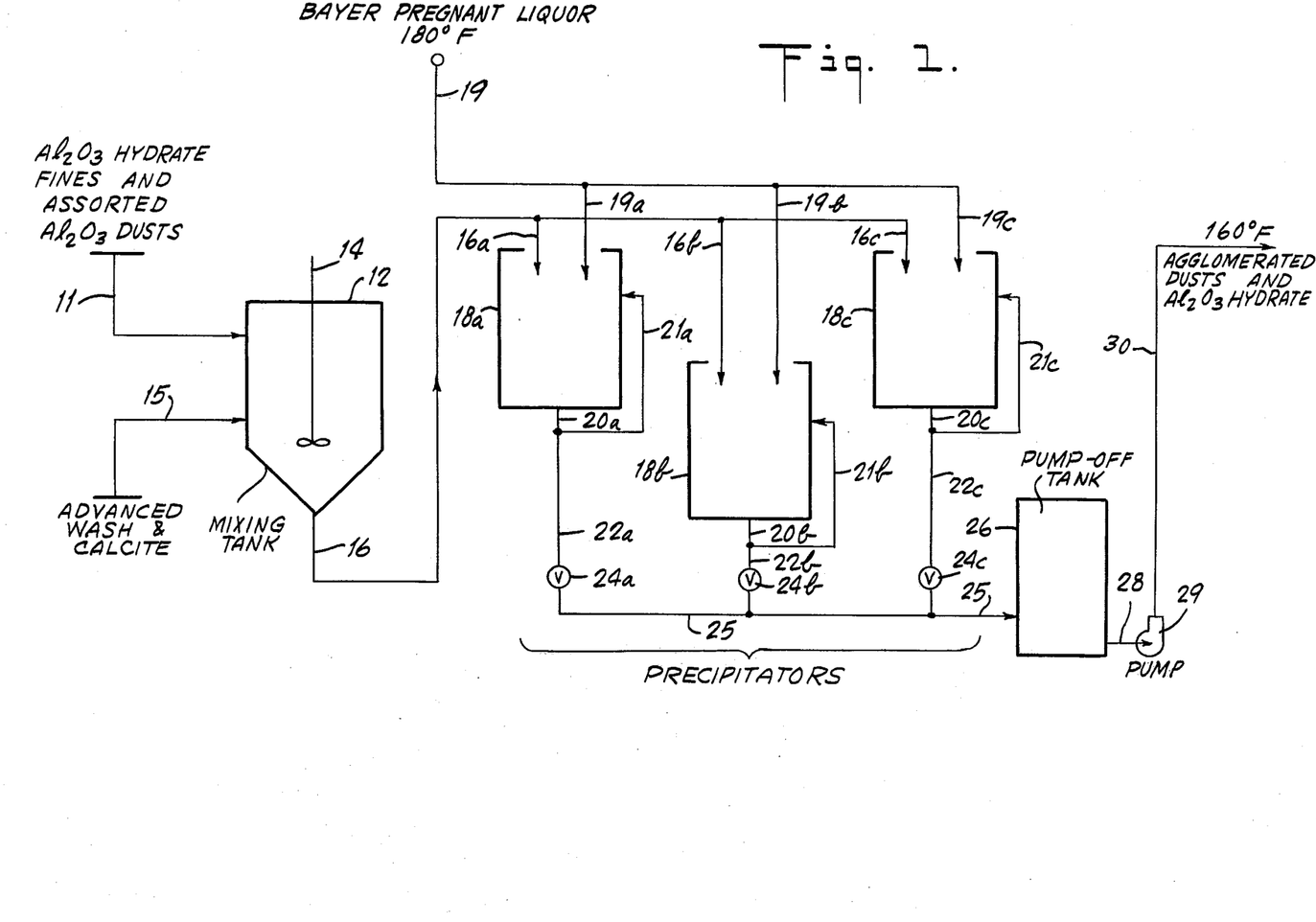

Reference is now made to the accompanying drawings which illustrate various flow schemes embodying the practices of this invention. FIG. 1 of the drawings illustrates schematically a flow scheme embodying the practices of this invention specifically directed to the agglomeration or coarsening of alumina dust.

As illustrated in FIG. 1 alumina dusts from a suitable source, not shown, are supplied via line 11 to mixing tank 12 equipped with agitator 14 or other equivalent mixing device. There is also introduced into mixing tank 12 via line 15 a slurry of calcium carbonate or calcite in wash water. If desired, as illustrated, excess fine seed alumina trihydrate particles might be introduced into mixing tank 12 with the alumina dust. The resulting aqueous admixture or slurry of alumina dusts, seed alumina trihydrate and calcium carbonate is withdrawn from mixing tank 12 via line 16 and supplied via outlets 16a, 16b and 16c to batch precipitator tanks 18a, 18b and 18c, respectively. Batch precipitator tanks 18a, 18b and 18c are supplied with Bayer pregnant liquor from a suitable source not shown at a suitable temperature, such as about 180° F., via line 19 and outlets 19a, 19b and 19c, respectively, as illustrated.

Within batch precipitator tanks 18a, 18b and 18c precipitation of alumina trihydrate from the Bayer pregnant liquor introduced thereinto occurs over a period of hours, such as about 8–12 hours, more or less, the precipitation taking place with cooling of the Bayer pregnant liquor therein from the charge temperature of about 180° F. to a temperature of about 160° F., the temperature drop within each of the batch precipitators being in the range about 15°–30° F., more or less. As illustrated, provision is made for the circulation of the contents of batch precipitator tanks 18a, 18b and 18c via lines 20a and 21b, 20b and 21b, 20c and 21c, respectively, as illustrated.

During precipitation of the alumina trihydrate from the Bayer pregnant liquor within batch precipitator tanks 18a, 18b and 18 c, coarsening or agglomeration of the alumina dust introduced thereinto occurs. Upon completion of the alumina trihydrate precipitation with resulting coarsening of the alumina dusts within batch precipitator tanks 18a, 18b and 18c the contents of the tanks are drawn off via lines 20a, 22a, lines 20b, 22b and lines 20c, 22c, and through valves 24a, 24b and 24c and line 25, respectively, as illustrated, into pump-off tank 26. From pump-off tank 26 the aqueous slurry wherein comprising coarsened or agglomerated alumina dust, precipitated alumina trihydrate and alumina trihydrate fines and at least partially depleted Bayer pregnant liquor is removed via line 28 and moved by pump 29, transported via line 30, as illustrated, for further handling and processing.

In the operation of the alumina dust coarsening or agglomeration operation illustrated in FIG. 1 and described hereinabove, it is desirable that the amount of alumina dust supplied to the Bayer pregnant liquor within the batch precipitator tanks 18a, 18b and 18c be an amount in the range about 25–150, preferably about 40–60 grams per liter of Bayer pregnant liquor. Along with the alumina dust to be coarsened there is admixed with the Bayer pregnant liquor finely divided calcium carbonate or calcite, such as an amount in the range from about 50–100 to about 200–300, preferably about 80–150 mg, per liter of Bayer pregnant liquor. Also, along with the alumina dust and calcium carbonate added to the Bayer pregnant liquor there is added, usually in the make-up of the aqueous slurry or admixture containing the alumina dust and/or calcium carbonate, water in an amount in the range about 50–150 ml per liter of Bayer pregnant liquor. It is also desirable, as illustrated, that the batch precipitator tanks be operated with cooling, such as from a temperature of about 175°–185° F., e.g. 180° F., the temperature of the Bayer pregnant liquor supplied thereto, to a temperature of about 145°–170° F., e.g. 160° F., the discharge temperature of the partially depleted Bayer pregnant liquor.

The batch precipitation operation within each of batch precipitator tanks 18a, 18b and 18c is conveniently carried out over a number of hours, such as from about 5 to about 36 hours, desirably in the range about 8–12 hours, more or less. There would be produced as a result of these operations a slurry comprising agglomerated alumina dust and alumina trihydrate particles wherein the solids content would have a particle size such that at least about 70% by weight of the solids have a particle size greater than 325 mesh in a liquor having an alumina:caustic ratio of about 0.470. If desired, instead of three batch precipitator tanks, only one may be employed or more than one, as illustrated, such as 2 to 5 tanks or more.

Figure 2:
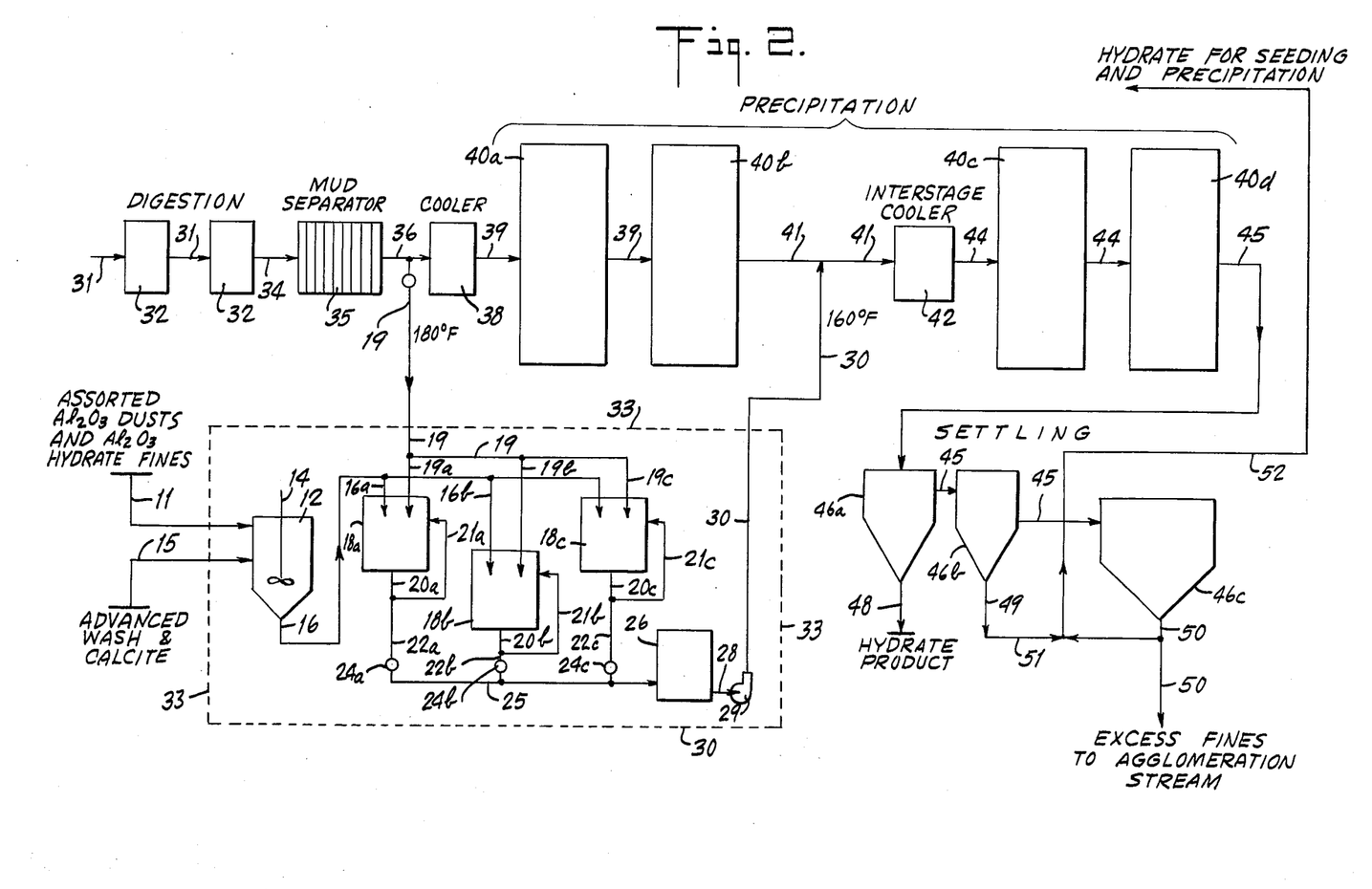
FIG. 2 shows a flow scheme incorporating the process of this invention in an overall process involving the production of alumina trihydrate by precipitation of alumina trihydrate from Bayer pregnant liquor.

Reference is now made to FIG. 2 of the drawings which shows another embodiment of the practices of this invention wherein the alumina dust coarsening or agglomeration operation in accordance with this invention is incorporated in a Bayer process plant for the recovery of alumina, as alumina trihydrate, from alumina ores, such as bauxite. The flow scheme of FIG. 1 is embodied and incorporated in FIG. 2, as indicated by dashed lines 33 and the same reference numerals which were employed to identify and describe the flow scheme of the special embodiment of the practice of this invention illustrated in FIG. 1 have been employed in FIG. 2.

Referring to FIG. 2 of the drawings, alumina ore, such as bauxite, from a suitable source, not shown, is supplied via line 31 to digesters 32 in series wherein the alumina ore is digested with aqueous caustic to yield a saturated or supersaturated solution of sodium aluminate, the Bayer pregnant liquor which is recovered via line 34 and passed through mud separator or filters 35 for the removal of solid impurities, such as iron oxide and the like. The resulting filtered Bayer pregnant liquor is recovered via line 36. A portion, usually a minor portion, about 2–20% by volume, more or less, of the solids-free Bayer pregnant liquor leaving mud separator 35 via line 36, is supplied via valved line 19 for use in the alumina dust agglomeration operation in accordance with this invention as described herein with reference to FIG. 1.

The remaining or major portion of the Bayer pregnant liquor is passed via line 36 to cooler 38 wherein its temperature is dropped, such as from about 180° F. as indicated, to a suitable lower temperature, e.g. to about 160° F. The resulting cooled Bayer pregnant liquor is then transferred via line 39 to precipitators 40a and 40b in series, as illustrated, to effect precipitation of alumina trihydrate from the cooled Bayer pregnant liquor in the presence of added seed alumina trihydrate fines.

Upon precipitation of the alumina trihydrate from the Bayer pregnant liquor within precipitators 40a and 40b the resulting Bayer pregnant liquor, now containing precipitated alumina trihydrate, is recovered via line 41 and admixed with the stream containing agglomerated or coarsened alumina dust alumina trihydrate recovered from the alumina dust coarsening operation via line 30, see FIG. 1. The resulting admixture is then supplied via line 41 to interstage cooler 42 and the resulting cooled Bayer pregnant liquor containing precipitated alumina trihydrate and agglomerated alumina dust is passed via line 44 through precipitators 40c and 40d in series to substantially complete the precipitation of alumina trihydrate from the Bayer pregnant liquor. There issues from precipitator 40d via line 45 a spent Bayer liquor having a substantially reduced sodium aluminate content, usually at a temperature of about 120°–135° F., such as about 125° F. and containing dispersed or suspended therein precipitated alumina trihydrate and the coarsened alumina dust. This Bayer liquor is then supplied via line 45 to settling tanks 46a, 46b and 46c. The larger particle size solids, particularly the larger particle size alumina trihydrate, is usually recovered as product, from settling tank 46a via line 48 for subsequent handling or treatment, such as calcining, for the manufacture of alumina. The finer particle size precipitated alumina trihydrate is usually recovered from settling tank 46b via line 49 and settling tank 46c via line 50 and passed via line 51 and 52 to precipitators 40a, 40b, 40c and 40d as seed alumina trihydrate to promote the precipitation of alumina trihydrate from the Bayer pregnant liquor undergoing treatment and precipitation within precipitators, 40a, 40b, 40c and 40d. Also, as indicated, a portion of the alumina trihydrate fines recovered from settling tank 46c may be transferred via line 50 for admixture with the alumina dust supplied via line 11, or with the calcium carbonate supplied via line 15 to the alumina dust coarsening or agglomeration operation as illustrated in FIG. 2 and more fully described in connection with FIG. 1.

In the practice of the embodiment of the invention illustrated in FIG. 2, it is preferred that the stream containing agglomerated or coarsened alumina dust and precipitated alumina trihydrate supplied via line 30 for admixture with the Bayer liquor flowing in line 41 to interstage cooler 42 to be at a temperature substantially the same as the temperature of the partially spent Bayer liquor leaving precipitator 40b. As illustrated in FIG. 2, the temperature of the stream in line 30 is about 160° F. Accordingly, it would be convenient for the temperature of the partially spent Bayer liquor leaving precipitator 40b be at a temperature of 160° F. However, it should be appreciated that the temperature of the stream in line 30 may be greater than or less than 160° F., such as a temperature in the range 175°–150° F. and the temperature of the stream leaving precipitator 40b via line 41 may be greater or less than 160° F., such as a temperature in the range 175°–150° F., more or less.

Further, as illustrated in FIG. 2, the stream of pregnant Bayer liquor removed from mud separator 35, line 36 and valved line 19 is at a temperature of about 180° F. but may be greater or less, such as at a temperature in the range 195°–170° F. Desirably, the stream of Bayer liquor removed via valved line 19, as illustrated, is removed prior to cooling the Bayer liquor in cooler 38. If desired, however, the liquid stream in valved line 19 may be removed after some cooling of the Bayer liquor has been initiated in cooler 38, such as from line 39, and, if desired, the liquid stream removed via valve line 19 may be removed from the Bayer pregnant liquor after some precipitation of alumina trihydrate has occurred, such as from precipitator 40a and 40b.

For convenience in illustrating the practices of this invention, FIG. 2 shows four precipitators in series. In actual commercial practice the number of precipitators employed may be as many as twelve or more with the sidestream containing the agglomerated alumina being returned to the main flow after about the third, fourth or fifth precipitator in series.

In my above-identified patent application, Ser. No. 182,481, I have described a technique for the coarsening of Bayer alumina trihydrate fine seed in the course of alumina trihydrate precipitation. In accordance with the practices of the invention disclosed in my patent application, Ser. No. 182,481, which involves the incorporation of calcium carbonate in the Bayer pregnant liquor undergoing precipitation for the production of alumina trihydrate, the improvement in coarsening of the precipitated alumina trihydrate is in the area of about 5–15 percentage points plus 44μ alumina trihydrate fraction. In the practices of the subject invention, however, the coarsening effect of the water-calcite treatment on alumina dust to form a slurry and the incorporation of the resulting slurry in Bayer process liquor undergoing cooling for precipitation of trihydrate therefrom is dramatic with respect to the agglomeration of the very vine particle size alumina dust. The resulting coarsening and agglomeration is about 25 times greater following the practices of this invention as compared with the absence thereof. On the basis of the plus 44μ fraction of the resulting agglomerated alumina dust product, the practices of this invention gave 2 to 3 times better results with respect to cyclone-separated dust and over 25 times better results with respect to electrostatic precipitator alumina dust. These dramatic results are set forth in Tables I, II and III, compare sample 1 with samples 4 and 6 of Table I and samples 3 and 5 of Table III.

In the test results reported in Tables II and III, the electrostatic precipitator alumina dust contained a 6% by weight plus 44μ fraction and at alumina dust charges of 50 g/l without water-calcite or calcium carbonate pretreatment or addition there was produced an alumina product having only 3.2% by weight greater than 44μ. This product was even finer than the starting electrostatic precipitator alumina dust. When, however, the practices of this invention were employed, such as with the addition of 100 ml of water and 250 mg of finely divided calcium carbonate, the resulting coarsened alumina product obtained 82.4% by weight alumina particle having a particle size greater than 44μ.

TABLE I

AGGLOMERATION-COARSENING OF MULTICLONE DUST IN BAYER PREGNANT LIQUOR WITH AND WITHOUT PRESLURRYING IT WITH WATER/ CONTAINING CaCO₃ POWDER

Operating Conditions:
i) Original Multiclone Dust Contained 10.8% plus 44μ Fraction.
ii) Agglomeration-Precipitation was Carried Out for 24 Hours at 160° F.

| Sample | Dust Charge (g) | Water Added (ml) | Calcite Added (mg) | Pregnant Liquor Used (ml) | Total Product (g) | % plus 44μ in Product |
|---|---|---|---|---|---|---|
| 1 | 120 | 0 | 0 | 900 | 187 | 20.8 |
| 2 | 120 | 100 | 0 | 800 | 185 | 28.8 |
| 3 | 120 | 0 | 80* | 900 | 185 | 33.6 |
| 4 | 120 | 100 | 80* | 800 | 183 | 50.4 |
| 5 | 120 | 0 | 80** | 900 | 186 | 36.6 |
| 6 | 120 | 100 | 80** | 800 | 185 | 44.4 |

*Analytical
**Industrial

TABLE II

AGGLOMERATION-COARSENING OF ELECTROSTATIC PRECIPITATOR DUST (ESP) IN BAYER PREGNANT LIQUOR WITH AND WITHOUT PRESLURRYING IT WITH CONTAINING CaCO₃ POWDER i) Original Dust (ESP) contained 6% plus 44μ fraction.
ii) Agglomeration-Precipitation was carried out for 24 hours at 160° F.

| Sample | Dust Charge (g) | Water Added (ml) | Calcite Added (mg) | Pregnant Liquor Used (ml) | Net Product (g) | % plus 44μ in Product |
|---|---|---|---|---|---|---|
| 1 | 25 | 100 | 0 | 800 | 55.7 | 54.4 |
| 2 | 25 | 100 | 100 | 800 | 51.8 | 88.8 |
| 3 | 25 | 100 | 150 | 800 | 50.1 | 88.3 |
| 4 | 50 | 100 | 0 | 800 | 62.0 | 6.4 |
| 5 | 50 | 100 | 100 | 800 | 58.6 | 53.6 |
| 6 | 50 | 100 | 150 | 800 | 57.3 | 64.0 |
| 7 | 50 | 100 | 200 | 800 | 56.5 | 68.8 |

TABLE III

AGGLOMERATION-COARSENING OF ELECTROSTATIC PRECIPITATOR DUST (ESP) IN BAYER PREGNANT LIQUOR WITH AND WITHOUT PRESLURRYING IT WITH WATER CONTAINING CaCO₃ POWDER i) Original Dust (ESP) Contained 6% plus 44μ fraction.
ii) Agglomeration-Precipitation was carried out for 24 hours at 160° F.

| Sample | Dust Charge (g) | Water Added (ml) | Calcite Added (mg) | Pregnant Liquor Used (ml) | Net Product (g) | % plus 44μ In Product |
|---|---|---|---|---|---|---|
| 1 | 25 | 0 | 0 | 800 | 59.1 | 46.8 |
| 2 | 25 | 0 | 250 | 800 | 53.3 | 91.6 |
| 3 | 50 | 0 | 0 | 800 | 62.0 | 3.2 |
| 4 | 50 | 0 | 250 | 800 | 55.2 | 58.4 |
| 5 | 50 | 100 | 250 | 800 | 63.2 | 82.4 |

In addition to the excellent coarsening effect, greater productivity was obtained from 62 g of net alumina trihydrate precipitate as compared with 63.2 g of precipitate, compare sample 3 with sample 5 in Table III.

The preferred practice of this invention is to employ a separate batch-type agglomeration-precipitation treatment of the alumina dust and not to mix the alumina dust with the fine Bayer process seed in the production plant for the production of alumina trihydrate. The preferred practice of this invention is illustrated in FIG. 2 of the drawings.

In the preferred practice of this invention involving the coarsening-agglomeration of alumina dust concomitantly with the precipitation of alumina trihydrate from Bayer pregnant liquor, the preferred amount of added calcium carbonate for incorporation along with alumina dust in Bayer process liquor during the coarsening operation is in the range about 100–250 mg of calcium carbonate per liter of Bayer process liquor. The process of this invention for the coarsening-agglomeration of alumina dust provides a very practical solution for the economic reutilization of large quantities of alumina dust in Bayer plants producing smelter-type alumina.

Comparative laboratory agglomeration tests employing the practices of this invention were carried out with different partially calcined alumina dusts. The results of these tests are set forth in accompanying Table IV:

TABLE IV
COMPARATIVE AGGLOMERATION OF ESP DUSTS IN HIGH AND LOW RATIO LIQUORS WITH AND WITHOUT CALCITE-WATER PRETREATMENT

Operating Conditions:
a) Dusts  
    No. 1    4% +325 mesh (44μ), little carbon, losts of extreme fines of 1–10μ (about 3 times as much as in Dust No. 2)  
    No. 2    4% +325 mesh (44μ); lots of carbon, relatively little 1–10μ fines  
b) Seeding - 62.5 gpl dust, based on original, undiluted liquor  
c) Pregnant liquor - 190 gpl caustic, 9 gpl org. carbon either 0.670 or 0.620 ratio

| Material | Sample | Ratio | Water Added (cc/l) | CaCO₃ Added (mg/l) | Al₂O₃ Precipitate (gpl) | % 325 mesh (44μ) |
|---|---|---|---|---|---|---|
| Dust No. 1 | 1 | 0.670 | 0 | 0 | 50.5 | 2.8 |
| " | 2 | " | 100 | 250 | 49.7 | 76.0 |
| " | 3 | " | 100 | 250 | 50.1 | 76.5 |
| Dust No. 2 | 4 | 0.670 | 0 | 0 | 48.7 | 30.4 |
| " | 5 | " | 100 | 250 | 48.5 | 77.0 |
| " | 6 | " | 100 | 250 | 49.0 | 78.0 |
| " | 7 | 0.620 | 0 | 0 | 37.0 | 21.2 |
| " | 8 | " | 80 | 200 | 36.2 | 52.5 |
| " | 9 | " | 100 | 250 | 37.4 | 58.0 |

It is seen from Table IV that the calcite-water treatment in accordance with the practices of this invention has considerable effect on the agglomeration of Dust No. 2. In the case of a high ratio starting liquor of 0.670, there was obtained asn agglomerated alumina product of 30.4 plus 44μ without treatment and a product of 78 plus 44μ with the treatment in accordance with this invention. The same indices for low ratio liquor of 0.620 were 21.2% plus 44μ and 58% plus 44μ, respectively. The agglomeration of Dust No. 2 is acceptable but the agglomeration of Dust No. 1, as indicated in Table IV, is dramatic and exceptional, i.e. from 2.8% plus 44μ without treatment to 76.5% plus 44μ when treated in accordance with this invention. It would appear that a reason for this is that Dust No. 1 contains at least 3 times the amount of extreme fines of 1–10μ than Dust No. 2. Dust No. 2 is more equivalent to cyclone separated fines (Multiclone dust) than electrostatic precipitator dust. Also Dust No. 1 contains only a small fraction of carbon as compared with Dust No. 2.

The results of additional tests showing the advantages of the practices of this invention are set forth in accompanying Tables V, VI and VII.

Table V shows that excess fine seed can be substituted for part of the dust charged and the agglomeration process still works satisfactorily.

Table VII shows that the process is not dependent on the nature of the industrial Bayer liquor and that it also works in synthetic laboratory prepared liquor. It also shows that calcite charges above 250 mg/l do not show additional improvement in effect.

TABLE V
AGGLOMERATION-COARSENING OF ESP DUST, MULTICLONE DUST AND FINE BAYER SEED - DUST MIXTURES AT 160° F. FOR 24 HOURS

Conditions:
(i) Filtrate used: 800 ml synthetic: 190 g/l caustic, 0.660 ratio  
(ii) Charges 60 g of dust only or 50/50 mixtures of dust and fine seed  
(iii) ESP Dust: 6% +325 mesh; fine seed 11.2% +325 mesh

| Sample | Fine Seed (g) | Multiclone Dust (g) | ESP Dust (g) | Water (ml) | Calcite (mg) | Net Precipitate (g) | (lb/cu ft) | % +325 Mesh |
|---|---|---|---|---|---|---|---|---|
| 1 | 30 | 30 | 0 | 0 | 0 | 55.3 | (2.82) | 51.2 |
| 2 | 30 | — | 30 | 0 | 0 | 60.3 | (3.08) | 16.8 |
| 3 | 30 | 30 | — | 100 | 150 | 60.0 | (3.06) | 80.0 |
| 4 | 30 | — | 30 | " | 200 | 61.0 | (3.11) | 72.0 |
| 5 | — | 60 | | " | 150 | 60.0 | (3.06) | 86.4 |
| 6 | — | — | 60 | " | 200 | 65.0 | (3.31) | 68.8 |

TABLE VI
AGGLOMERATION-COARSENING OF ESP DUST IN SYNTHETIC AND INDUSTRIAL BAYER LIQUORS AT 160° F. FOR 24 HOURS

Conditions:
(i) charges: 60 g (6% +325 mesh)  
(i) Liquor used: 800 ml (synthetic: 190 caustic, 0.660 ratio)

| Sample | Liquor Used | Water Added (ml) | Calcite Added (mg) | Precipitate (g) | (lb/cu ft) | % +325 Mesh (+44μ) |
|---|---|---|---|---|---|---|
| 1 | Synthetic | 0 | 0 | 76.0 | (3.87) | 4.4 |
| 2 | " | 100 | 250 | 76.4 | (3.89) | 67.6 |
| 3 | Bayer | 0 | 0 | 63.4 | (3.23) | 4.0 |
| 4 | " | 100 | 250 | 64.4 | (3.28) | 61.2 |
| 5 | " | 100 | 300 | 62.3 | (3.15) | 57.6 |
| 6 | " | 100 | 350 | 57.5 | (2.93) | 62.0 |

Table VII shows the agglomeration effect over the whole range of particle sizes and not just for the 44 micron size limit. The data of Table VII also confirms that the practice of the invention is applicable to both synthetic and actual commercial Bayer liquors.

TABLE VII
PARTICLE SIZE DISTRIBUTION OF ESP DUST AGGLOMERATED IN SYNTHETIC AND INDUSTRIAL BAYER LIQUORS AT 160° F. FOR 24 HOURS, USING 62.5 AND 75 g/l SEED CHARGES (DUST)*

| Sample | Liquor | Dust Charge (g/l) | Water Added (ml) | Calcite Added (mg) | % Greater than (μ) 74 | 53 | 44 | % Smaller than (μ) 44 | 33 | 20 | 10 |
|---|---|---|---|---|---|---|---|---|---|---|---|
| 1 | Synthetic** | 75 | 0 | 0 | 0.4 | 1.7 | 4.5 | 95.5 | 65.0 | 37.0 | 21.0 |
| 2 | " | 75 | 100 | 250 | 2.0 | 50 | 67.5 | 33.5 | 8.5 | 4.3 | 3.4 |
| 3 | Bayer | 75 | 100 | 250 | 0.7 | 41.0 | 68.5 | 31.5 | 10.8 | 4.6 | 2.8 |
| 4 | Bayer | 75 | 100 | 250 | 1.7 | 47.0 | 67.5 | 32.5 | 9.5 | 4.8 | 3.6 |
| 5 | Bayer | 62.5 | 0 | 0 | 0.6 | 6.3 | 16.5 | 83.5 | 58.0 | 26.0 | 13.5 |
| 6 | Bayer | 62.5 | 0 | 250 | 10.0 | 46.0 | 72.0 | 28.0 | 11.0 | 3.0 | 2.0 |
| 7 | Bayer | 62.5 | 100 | 250 | 29.0 | 68.0 | 85.0 | 15.0 | 6.8 | 2.3 | 1.7 |

*Original dust contained 93.8% minus 325 mesh (44μ) fraction  
**Synthetic liquor contained: 190 gpl caustic, 125 gpl Al₂O₃, 240 gpl TTS and 5 gpl Na₂SO₄.

The preferred practice of this invention is indicated in FIG. 1 of the drawings. In this embodiment, as indicated in FIG. 2, a secondary stream from the primary Bayer pregnant liquor stream would be withdrawn and employed for the rapid agglomeration of the alumina dusts and excess hydrate fines, such as materials smaller than about 44μ (325 mesh). The secondary stream or side-stream removed from the primary Bayer pregnant liquor stream would be in the range about 5–10% vol. of the total Bayer pregnant liquor flow. This secondary stream in accordance with the practices of this invention would then be seeded with a mixture comprising dust and optionally excess hydrate fines along with calcite and water or wash liquor at a temperature about 180°–160° F. and agglomerated in a small batch precipitator, about 3–5 in number, working on very short 8–12 hour cycles, down to drawoff ratios of about 0.470. A continuous pump-off from the resulting agglomeration would than be sent to the main circuit somewhere before the interstage cooler as indicated in FIG. 2. The main advantages of such a side-stream agglomeration operation are, 1. effective fast coarsening of fine partially calcined alumina dust,
2. little need for elaborate precipitation control measures in the main alumina trihydrate precipitation circuit since unusual fluctuations in dust and fines generation would be corrected in the agglomeration side-stream operation in accordance with this invention, and
3. the alumina product produced would be expected to be all plus 44μ (325 mesh).

As will be apparent to those skilled in the art in the light of the foregoing disclosure, many modifications, alterations and substitutions are possible in the practice of this invention without departing from the spirit or scope thereof:

I claim:

1. A method of coarsening partially calcined alumina dust recovered during the calcining of alumina trihydrate to produce alumina which comprises forming an aqueous admixture or slurry consisting essentially of partially calcined alumina dust recovered during the calcining of alumina trihydrate to alumina, said partially calcined alumina dust exhibiting a loss on ignition of about 12–20% by weight after 1 hour at 1000° C. and being comprised of a mixture of $\alpha$-$Al_2O_3$, $\gamma$-$Al_2O_3$, $Al_2O_3 \cdot H_2O$ and $Al_2O_3 \cdot 3H_2O$, said $Al_2O_3 \cdot H_2O$ being present in said mixture in an amount of about 5% up to about 20% by weight, said mixture having a particle size such that at least 80–90% weight is less than 44 microns, and finely divided calcium carbonate or calcite and introducing the resulting aqueous admixture or slurry into filtered Bayer pregnant liquor and precipitating alumina trihydrate from the resulting Bayer pregnant liquor.

2. A method in accordance with claim 1 wherein said Bayer pregnant liquor contains about 100–130 g/l $Al_2O_3$, 160–200 g/l caustic soda measured as $Na_2CO_3$ and about 230–260 g/l total titratable soda.

3. A method in accordance with claim 1 wherein said partially calcined alumina dust in said aqueous admixture or slurry with calcium carbonate is added to said Bayer pregnant liquor in an amount of about 50 grams per liter of said Bayer pregnant liquor.

4. A method in accordance with claim 3 wherein said finely divided calcium carbonate or calcite in said aqueous admixture or slurry is added to said Bayer pregnant liquor in an amount in the range from about 100 to about 200–300 milligrams per liter of said Bayer pregnant liquor.

5. A method in accordance with claim 1 wherein the coarsening of said partially calcined alunina dust in said Bayer pregnant liquor and the precipitation of alumina trihydrate from said Bayer pregnant liquor is carried out at a temperature in the range from about 145° F. to about 180° F.

6. A method in accordance with claim 5 wherein the coarsening and precipitation is carried out over an extended period of time in the range from about 5 to about 36 hours.

7. A method in accordance with claim 6 wherein the coarsening and precipitation is carried out over a period of time less than about 24 hours.

8. A method in accordance with claim 1 wherein said aqueous admixture or slurry is added to said Bayer pregnant liquor in an amount such that there is added to said Bayer pregnant liquor about 25–150 grams partially calcined alumina per liter of Bayer pregnant liquor and greater than about 100 milligrams calcium carbonate or calcite per liter of Bayer pregnant liquor.

9. A method in accordance with claim 8 wherein said aqueous admixture or slurry is added to said Bayer pregnant liquor in an amount such that about 50–150 ml of water in said admixture or slurry is added to about 1 liter of said Bayer pregnant liquor.

10. A method in accordance with claim 8 wherein said agueous admixture or slurry is added to said Bayer pregnant liquor in an amount such that about 75–125 ml of water in said admixture or slurry is added to about 1 liter of said Bayer pregnant liquor.

11. A method in accordance with claim 8 wherein said aqueous admixture or slurry is added to said Bayer pregnant liquor in an amount such that about 100 ml of water in said admixture or slurry is added to about 1 liter of said Bayer pregnant liquor.

12. In an operation wherein a primary stream of a filtered Bayer pregnant liquor is cooled to precipitate alumina trihydrate therefrom, the improvement which comprises withdrawing a secondary stream of filtered Bayer pregnant liquor from said primary stream, adding to said secondary stream of Bayer pregnant liquor an aqueous admixture or slurry consisting essentially of partially calcined alumina dust recovered during the calcincing of alumina trihydrate to alumina, said partially calcined alumina dust exhibiting a loss on ignition of about 12–20% by weight after 1 hour at 1000° C. and being comprised of a mixture of $\alpha$-$Al_2O_3$, $\gamma$-$Al_2O_3$, $Al_2O_3 \cdot H_2O$ and $Al_2O_3 \cdot 3H_2O$, said $Al_2O_3 \cdot H_2O$ being present in said mixture in an amount of about 5% up to about 20% by weight, said mixture having a particle size such that at least 80–90% by weight is less than 44 microns, and finely divided calcium carbonate or calcite, cooling the resulting secondary stream of Bayer pregnant liquor now containing the added aqueous admixture or slurry therein to precipitate alumina trihydrate and introducing the resulting treated secondary stream into admixture with said primary stream of said Bayer pregnant liquor and precipitated additional alumina trihydrate therefrom.

13. An operation in accordance with claim 12 wherein the precipitation of alumina trihydrate from said primary stream of Bayer pregnant liquor is commenced at a temperature in the range from about 145° F. to about 180° F.

14. An operation in accordance with claim 12 wherein the precipitation of alumina trihydrate from said secondary stream is commenced at a temperature in the range from about 160° F. to about 180° F.

15. An operation in accordance with claim 12 wherein said primary stream of Bayer pregnant liquor after the withdrawal of said secondary stream of Bayer pregnant liquor therefrom and prior to the introduction of said resulting treated secondary stream into admixture with said primary stream is cooled to effect precipitation of alumina trihydrate therefrom.

16. An operation in accordance with claim 15 wherein said primary stream of Bayer pregnant liquor is cooled to a temperature in the range from about 170°-180° F. to about 145°-160° F.

17. An operation in accordance with claim 12 wherein said primary stream of Bayer pregnant liquor containing in admixture therewith said resulting treated secondary stream is cooled to a temperature in the range from about 120° F. to about 135° F. to effect the precipitation of additional alumina trihydrate therefrom.

18. An operation in accordance with claim 12 wherein said primary stream of Bayer pregnant liquor prior to the withdrawal of said secondary stream therefrom contains about 100-130 g/l $Al_2O_3$, about 160-200 g/l caustic soda measured as $Na_2CO_3$ and about 230-260 g/l total titratable soda.

19. An operation in accordance with claim 12 wherein the precipitation of alumina trihydrate from said primary stream is carried out in the presence of added finely divided alumina trihydrate as seed.

20. An operation in accordance with claim 19 wherein the precipitation of alumina trihydrate from said primary stream in the presence of added finely divided alumina trihydrate as seed is carried out at a temperature in the range from about 120° F. to about 160° F.

21. An operation in accordance with claim 19 wherein alumina trihydrate is precipitated from said primary stream of Bayer pregnant liquor in the presence of added finely divided alumina trihydrate as seed at a temperature in the range from about 180° F. to about 160° F. prior to the introduction of said resulting treated secondary stream.

22. An operation in accordance with claim 12 wherein the precipitation of alumina trihydrate from said secondary stream of Bayer pregnant liquor is carried out in the presence of finely divided alumina trihydrate as seed.

23. An operation in accordance with claim 22 wherein the precipitation of alumina trihydrate from said secondary stream in the presence of added finely divided alumina trihydrate as seed is carried out at a temperature in the range from about 140° F. to about 180° F.

24. An operation in accordance with claim 22 wherein the precipitation of alumina trihydrate from said secondary stream of Bayer pregnant liquor is carried out at a temperature in the range from about 160° F. to about 180° F.

25. An operation in accordance with claim 12 wherein alumina trihydrate is precipitated from said primary stream in the presence of added finely divided alumina trihydrate as seed and prior to the withdrawal therefrom of said secondary stream.

26. An operation in accordance with claim 12 wherein alumina trihydrate is precipitated from said primary stream in the presence of added finely divided alumina trihydrate as seed and subsequent to the withdrawal therefrom of said secondary stream but prior to the introduction of said resulting treated secondary stream.

* * * * *

UNITED STATES PATENT AND TRADEMARK OFFICE
CERTIFICATE OF CORRECTION

PATENT NO. : 4,051,222
DATED : September 27, 1977
INVENTOR(S) : Bohdan Gnyra

It is certified that error appears in the above-identified patent and that said Letters Patent are hereby corrected as shown below:

Column 1, line 33, "vis" should read -- via --

Column 3, line 55, after "place", a period (.) should be inserted

Column 4, line 38, "wherein" should read -- therein --

Column 6, line 56, "and" should read -- and/or --

Column 7, line 13, "vine" should read -- fine --

Column 9, under Table IV, next to No. 1, "losts" should read -- lots --

Column 9, line 31, "asn" should read -- an --

Column 10, under Table VI, "i", second occurrence, should read -- ii --

Column 11, line 44, after "80-90%" the word -- by -- should be inserted

UNITED STATES PATENT AND TRADEMARK OFFICE
CERTIFICATE OF CORRECTION

PATENT NO. : 4,051,222
DATED : September 27, 1977
INVENTOR(S) : Bohdan Gnyra

It is certified that error appears in the above-identified patent and that said Letters Patent are hereby corrected as shown below:

Column 11, line 66, "alunina" should read -- alumina --

Column 12, line 23, "agueous" should read -- aqueous --

Column 12 line 54, "precipitated" should read -- precipitating --

The following claims have been omitted:

-- 27. An operation in accordance with Claim 12 wherein said secondary stream of Bayer pregnant liquor is withdrawn from said primary stream prior to cooling said primary stream. --

-- 28. An operation in accordance with Claim 12 wherein said secondary stream of Bayer pregnant liquor is withdrawn from said primary stream after initiating cooling of said primary stream. --

-- 29. An operation in accordance with Claim 28 wherein said secondary stream is removed from said primary stream before alumina

UNITED STATES PATENT OFFICE
CERTIFICATE OF CORRECTION

Patent No. 4,051,222    Dated September 27, 1977

Inventor(s) Bohdan Gnyra

It is certified that error appears in the above-identified patent and that said Letters Patent are hereby corrected as shown below:

trihydrate precipitates from said primary stream.

*Signed and Sealed this*

*Thirtieth* Day of *May 1978*

[SEAL]

Attest:

RUTH C. MASON
*Attesting Officer*

LUTRELLE F. PARKER
*Acting Commissioner of Patents and Trademarks*